Feb. 29, 1944.  W. J. EVINGER  2,343,175
KNIFE
Filed July 16, 1943
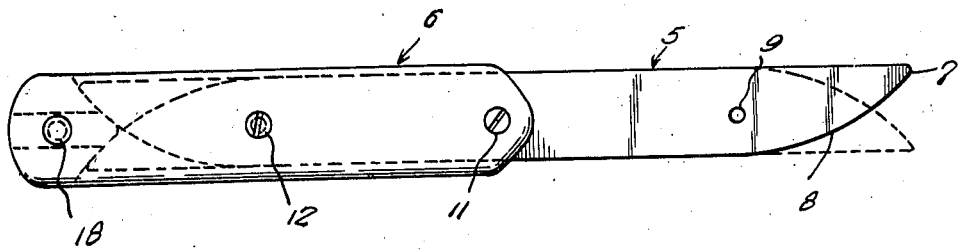
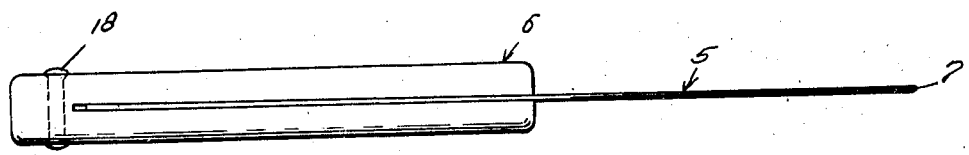
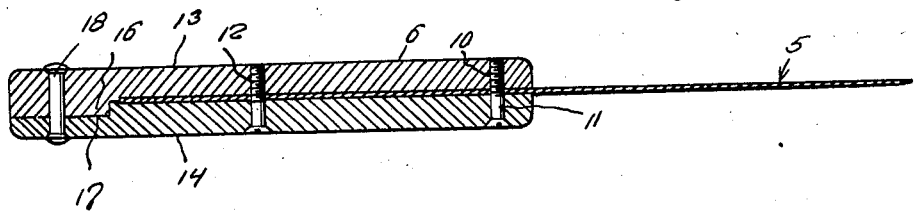
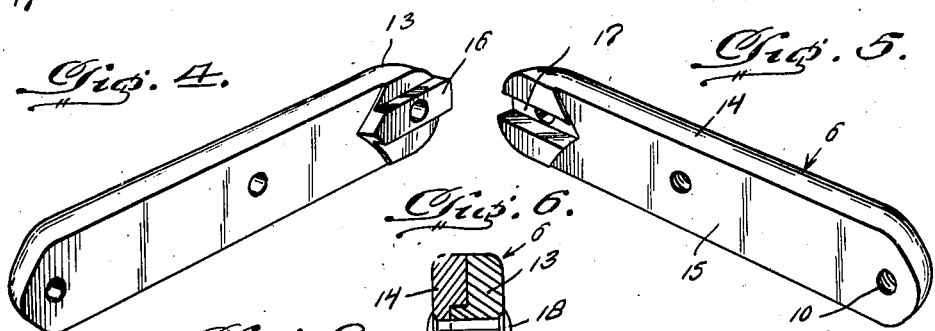
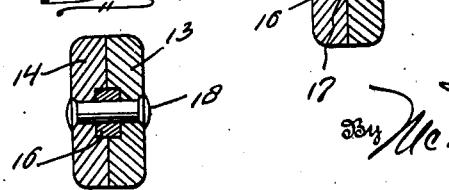
Inventor
Walter J. Evinger Patented Feb. 29, 1944

2,343,175

UNITED STATES PATENT OFFICE 2,343,175

KNIFE

Walter J. Evinger, Denver, Colo.

Application July 16, 1943, Serial No. 494,996

1 Claim. (Cl. 30—161)

This invention relates to a knife and the primary object of the invention is to materially increase the usefulness of the blade as to its cutting ability by providing a cutting edge which extends from end to end of the blade and a handle which will permit either half of the cutting edge and either end of the blade to be arranged in working position while the other half of the cutting edge and the other end of the blade will be sheathed by said handle, consequently whenever a portion of the cutting edge becomes dull or unfit for use, the other portion of the cutting edge may be readily brought into working position with the assurance against relative movement between the handle and blade occurring during the use of the device.

Another object of this invention is the provision of a handle construction which will be comfortable to grip and a fastening means for said handle to the blade which will assure against relative movement therebetween during the use of the device in cutting or paring operations, and may be easily actuated to permit pivotal movement of the blade relative to the handle when it is desired to change the portions of the cutting edges relative to the working or cutting position and will permit full detachment of the blade from the handle in order that the cutting edge extending from end to end of said blade may be conveniently sharpened.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation illustrating a knife constructed in accordance with my invention.

Figure 2 is a top plan view illustrating the knife.

Figure 3 is a longitudinal sectional view showing the fastening means of the blade to the handle.

Figure 4 is a perspective view illustrating one section of the handle.

Figure 5 is a perspective view illustrating the other section of the handle.

Figure 6 is a transverse sectional view of the handle showing the connection between the sections.

Figure 7 is a transverse sectional view illustrating a modified form of my invention.

Referring in detail to the drawing, the numeral 5 indicates the blade of the knife and 6 the handle. By referring to Figure 1 it will be seen that the blade has each end pointed, as at 7, and that the cutting edge 8 extends from end to end of the blade along one longitudinal edge of the blade. The cutting edge 8 formed as specified and when the blade is used in connection with the handle, will provide to said blade cutting portions of substantially equal size and that either cutting portion may be arranged exteriorly of the handle and in cutting position.

The blade adjacent its end portions is provided with openings 9 either one of which may be brought within the handle and is also provided with an opening 10 located intermediate the ends of the blade for the purpose of receiving a pivot 11 used in connecting the blade to the handle in order that the blade may have pivotal movement with respect to the handle.

A fastener 12 is carried by the handle and may be positioned in either one of the openings 9 for the purpose of securing the blade against pivotal movement with respect to the handle, and can be easily removed whenever it is desired to change the cutting portions of the blade with respect to the handle or working position of the blade.

The pivot 11 and fastener 12 are in the form of screws which thread into the handle with their heads countersunk.

The handle 6 includes elongated companion sections 13 and 14 provided with flat faces 15 adapted to be arranged in opposed relation and spaced from each other by an elongated member 16 forming an integral part of the section 13 and fitting in a groove 17 in the section 14. A fastener 18 extends through the elongated member 16 and the sections of the handle.

This construction besides spacing portions of the sections 13 and 14 from each other to receive approximately one-half of the blade, also prevents said sections from having pivotal or relative movement with respect to each other.

As shown in Figure 7, the member 16 may be separate from either of the sections 13 and 14 and said sections are provided with grooves to receive said member with the fastener 18 extending through the member 16. The fastener 18 may be in the form of a rivet for the purpose of securing the sections of the handle together with the member 16 preventing relative movement between the sections.

From the foregoing description taken in connection with the accompanying drawing it will be seen that approximately one-half of the blade is sheathed by the handle while the other half of the blade is exposed for cutting purposes and that pivotal movement can be easily brought about between the blade and handle whenever it is desired to change one cutting portion of the blade in working position with that of the other cutting portion of the blade.

A knife constructed in accordance with the foregoing may have many uses such as for paring vegetables, fruits or the like or for butchering or cutting of meats and similar material and also may be utilized for hunting purposes. It is to be understood that the size of the blade and handle may be varied in accordance with the use to which the knife is to be employed for.

When the blade and handle are secured against pivotal movement, the opening 9 in the blade which is exteriorly of the handle may be employed to suspend the entire device on a hook or like support.

While I have shown and described the preferred embodiment of my invention, it will be understood that minor changes in construction, combination and arrangement of parts may be made without departing from the spirit and scope of the invention as claimed.

Having thus described my invention, what I claim is:

In a knife, a pair of elongated handle sections having flat faces arranged opposite to each other and one of said sections having a groove adjacent one end thereof, an elongated member formed on the other section adjacent one end of the latter and received in the groove to space the flat faces apart for providing a blade-receiving slot between the sections and to prevent said sections from rotating relative to each other, a fastener connecting the sections and extending through the elongated member to prevent movement thereof out of the groove, a blade pivoted intermediate its ends to said sections and manually movable to permit approximately either half thereof to enter and lie in the blade slot with the other half lying outwardly of the slot in cutting position, a fastener detachably connecting the blade to said sections to prevent pivotal movement of the blade relative to said sections, said elongated member having one end thereof beveled in opposite directions to provide stops for either end of the blade to abut for limiting the movement of the blade into the blade slot.

WALTER J. EVINGER.